United States Patent [19]

Reinhart

[11] Patent Number: 5,776,524
[45] Date of Patent: Jul. 7, 1998

[54] PROCESS FOR TREATING SMALL INTESTINE BACTERIAL OVERGROWTH IN ANIMALS

[75] Inventor: Gregory A. Reinhart, Dayton, Ohio

[73] Assignee: The Iams Company, Dayton, Ohio

[21] Appl. No.: 741,300

[22] Filed: Oct. 30, 1996

Related U.S. Application Data

[63] Continuation of Ser. No. 428,875, Apr. 25, 1997, abandoned.

[51] Int. Cl.$^6$ .................................................. A23K 1/18
[52] U.S. Cl. .............................................. 426/2; 426/805
[58] Field of Search ........................ 426/641, 2, 658, 426/805

[56] References Cited

U.S. PATENT DOCUMENTS

| | | |
|---|---|---|
| 3,816,174 | 6/1974 | Nagasawa et al. |
| 3,816,394 | 6/1974 | Nagasawa et al. |
| 4,057,655 | 11/1977 | Okada et al. |
| 4,142,916 | 3/1979 | Ogasa et al. |
| 4,147,773 | 4/1979 | Ogasa . |
| 4,588,595 | 5/1986 | Okonogi et al. |
| 4,601,985 | 7/1986 | Okonogi et al. |
| 4,645,667 | 2/1987 | Hashimoto et al. |
| 4,871,574 | 10/1989 | Yamazaki et al. ................. 426/622 |
| 4,873,229 | 10/1989 | Deya et al. ........................ 426/42 |
| 5,219,842 | 6/1993 | Okada et al. ..................... 514/54 |
| 5,294,458 | 3/1994 | Fujimori . |

FOREIGN PATENT DOCUMENTS

| | | |
|---|---|---|
| 0159891 | 10/1985 | European Pat. Off. |
| 0201332 | 11/1986 | European Pat. Off. |
| 0221520 | 5/1987 | European Pat. Off. |
| 1176513 | 11/1983 | Japan . |

OTHER PUBLICATIONS

Morisse et al, "Effect of a Fructooligosaccharide Compound In Rabbits Experimentally Infected with *E. Coli* 0.103", *Journal of Applied Rabbit Research*, vol. 15(B):pp. 1137–1143, 1992.

Mitsuoka J. of Industrial Microbiology, 6 (1990) pp. 263–268 (Part of Info. Package) Submitted by applicant (PTOL–1449).

McBurney, Michael I., "The gut:central organ in nutrient requirements and metabolism", Aug. 9, 1993, pp. 260–265.

Batt et. al., "Enteric bacteria: Friend or foe?", pp. 261–267.

Rutgers et al., "Small intestinal bacterial overgrowth in dogs with chronic intestinal disease," *JAVMA*, vol. 206, No. 2, Jan. 15, 1995, pp. 187–193.

Willard et al., "Effects of dietary supplementation of fructooligosaccharides on small intestinal bacterial overgrowth in dogs," *Am. J. Vet. Res.*, vol. 55, No. 5, May 1994, pp. 1–11.

Terada et al., "Effect of Dietary Lactosucrose on Faecal Flora and Faecal Metabolites of Dogs," *Microbial Ecology in Health and Disease*, vol. 5, 1992, pp. 87–92.

Kiyosawa et al., "Lactulose and Intestinal Microflora in Infant Nutrition," *Bifidobacteria Microflora*, vol. 5(1), 1986, pp. 27–35.

Terada et al., "Effect of Lactosucrose ($4^G$–β–D–Galactosylsucrose) on Fecal Flora and Fecal Putrefactive Products of Cats," *J. Vet. Med. Sci.*, 55(2):000–000, 1993, pp. 1–5.

Kawase et al., "Effects of Composition of Infant Formulas on the Intestinal Microflora of Infants," *Bifidobacteria Microflora*, vol. 2(1), 1983, pp. 25–31.

Spiegel et al., "Safety and Benefits of Fructooligosaccharides as Food Ingredients," *Food Technology*, Jan. 1994, pp. 85–89.

Mizota et al., "Lactulose as a Sugar with Physiological Significance," Bulletin of the IDF 212, Session III, Chapter 11, pp. 69–76, (1986).

Tomita, M., "Lactulose and its application to foods," Central Research Laboratory Morinaga Milk Industry Co., Ltd., Tokyo, Japan, pp. 172–184, (1981).

Imaizumi et al., "Effects of Xylooligosaccharides on Blood Glucose, Serum and Liver Lipids and Cecum Short–chain Fatty Acids in Diabetic Rats," Reprinted from Agricultural and Biological Chemistry, pp. 199–205. (1990).

Hoshi et al., "Galactosylsucrose and Xylosylfructoside Alter Digestive Tract Size and Concentrations of Cecal Organic Acids in Rats Fed Diets Containing Cholesterol and Cholic Acid," *American Institute of Nutrition*, 1994, pp. 52–60.

Riggio et al., "Effect of Lactitol and Lactulose Administration on the Fecal Flora in Cirrhotic Patients," *J. Clin. Gastroenterol*, vol. 12, No. 4, 1990, pp. 433–436.

Ueda, K., "Immunity Provided by Colonized Enteric Bacteria," *Bifidobacteria Microflora*, vol. 5(1), 1986, pp. 67–72.

NutraFlora™ Fructooligosaccharides Information Package, Jan. 1994.

Okazaki et al., "Effect of Xylooligosaccharide on the Growth of Bifidobacteria," *Bifidobacteria Microflora*, vol. 9, No. 2, 1990, pp. 77–86.

Abstract only—"Regulation of the internal flora by food," Zentralbi Hyg Umweltmed, Mar. 1991, pp. 277–301.

Abstract only—Fujikawa et al., "Effect of Xylooligosaccharide on Growth of Intestinal Bacteria and Putrefaction Products," *J. Jpn. Soc. Nutr. Food Sci.*, vol. 44, No. 1, 1991, pp. 37–40.

Abstract only—Okazaki et al., "In vitro Digestibility and in vivo Utilization of Xylobiose," *J. Jpn. Soc. Nutr. Food Sci.*, vol. 44, No. 1, 1991, pp. 41–44.

Abstract only—Okazaki et al., "Effects of Xylooligosaccharide on Growth of Bifidobacteria," *J. Jpn. Soc. Nutr. Food Sci.*, vol. 43, No. 6, 1990, pp. 395–401.

*Primary Examiner*—Arthur L. Corbin
*Attorney, Agent, or Firm*—Killworth, Gottman, Hagan & Schaeff, L.L.P.

[57] ABSTRACT

A pet food product which is useful for reducing the amount of harmful bacteria in the small intestine is provided. The pet food composition contains, on a dry matter basis, from about 0.2 to 1.5 weight percent of a fructooligosaccharide and is fed to a pet, such as a dog, cat or horse.

3 Claims, No Drawings

PROCESS FOR TREATING SMALL INTESTINE BACTERIAL OVERGROWTH IN ANIMALS

This application is a continuation of U.S. Pat. application Ser. No. 08/428,875, filed Apr. 25, 1997, now abandoned.

BACKGROUND OF THE INVENTION

This invention relates to a pet food product for use in reducing the amount of harmful bacteria in the small intestine of pet animals, and more particularly to a pet food composition containing fructooligosaccharides.

Small intestinal bacterial overgrowth (IBO) occurs in people and mammalian pet animals such as dogs, cats, and horses. It can be caused by poor motility, retention of food, decreased gastric acidity or surgical bypass of the stomach. IBO may also be idiopathic. Pet animals and people affected with IBO may have clinical signs compatible with severe small intestinal disease such as diarrhea and weight loss. Currently, therapy involves removing the cause of the bacterial overgrowth through surgery and/or administering various antibiotics, such as tetracycline or tylosin. However, a need exists for a dietary means to control IBO.

Finding such a means requires an understanding of the nature of bacteria in the small intestine. A normal, healthy gut microflora is necessary for protection against invading pathogenic organisms. The ongoing process of "good" bacteria preventing overgrowth of "bad" bacteria is termed colonization resistance. This refers to the indigenous population of beneficial microflora such as Lactobacillus and Bifidobacterium preventing the colonization or overgrowth of harmful bacteria (including Salmonella, E. coli and Clostridia). Gastrointestinal disease states are often accompanied by unfavorable shifts in the microflora population. Reestablishment of a favorable microfloral environment must occur before normal bowel function can be regained.

Increases in the "good" bacteria Bifidobacterium in dogs have been shown using lactosucrose, an artificial saccharide. However, lactosucrose may not be useful in all pet food products due to cost, allergic potential, and/or adverse reactions with other ingredients.

Therefore, a need still exists for a gastrointestinal diet which uses a natural product to promote colonization resistance in healthy animals and restore desirable microflora in diseased animals.

SUMMARY OF THE INVENTION

The present invention meets that need by providing a pet food product for use in reducing the amount of harmful bacteria in the small intestine which comprises a pet food composition containing, on a dry matter basis, from about 0.2 to 1.5 weight percent of a fructooligosaccharide, most preferably about 1.0 weight percent. Furthermore, a process for reducing the amount of harmful bacteria in the small intestine of animals is also provided. The process comprises feeding an animal a diet consisting essentially of a pet food composition containing, on a dry matter basis, from about 0.2 to 1.5 weight percent of a fructooligosaccharide.

Fructooligosaccharides (FOS) are naturally occurring compounds that are found in a variety of plants, including onions, bananas, barley, and wheat. In general, these compounds are not digested by mammals but may be metabolized by intestinal bacterial species, such as Bifidobacterium. However, not all intestinal bacteria can metabolize fructooligosaccharides. In particular, bacteria such as Salmonella, E. coli and Clostridia are unable to process FOS.

This preferential digestibility can be used to improve the overall bacterial flora in the small intestine. Because FOS will only feed "good" bacteria such as Lactobacillus and Bifidobacterium, the amounts of harmful bacteria such as Salmonella, E. coli and Clostridia will decrease due to a reduction in food resources. Therefore, by providing a preferred food source for beneficial bacterial species, a FOS-supplemented diet can increase "good" intestinal bacteria while reducing the amount of "bad" bacteria.

Accordingly, it is an object of the present invention to provide a FOS-supplemented pet food product which improves the gastrointestinal health of a pet animal by reducing the amount of harmful bacteria in the small intestine.

DETAILED DESCRIPTION OF THE PREFERRED EMBODIMENTS

The present invention reduces harmful bacteria in the intestine using a diet containing fructooligosaccharides. The pet food composition of the present invention comprises from about 0.2 to 1.5 weight percent of a fructooligosaccharide, most preferably about 1.0 weight percent of a fructooligosaccharide.

Fructooligosaccharides are naturally occurring compounds which can be found in a variety of fruits and vegetables including banana, barley, garlic, honey, onion, rye, brown sugar, tomato, asparagus root, Jerusalem artichoke, and wheat. There are three varieties of fructooligosaccharides: 1-kestose (abbreviated as $GF_2$), nystose ($GF_3$), and $1^F$-B- fructofuranosylnystose ($GF_4$). While fructooligosaccharides can be extracted from plants such as those mentioned above, they can also be formed artificially by adding one, two, or three fructose units to a sucrose molecule by a B-(2-1)-glycosidic linkage of the fructose unit(s) to the fructose unit of sucrose. Fructooligosaccharides are commercially available under the tradename "Nutraflora" from Golden Technologies Company, Incorporated.

Any nutritionally sound pet food can be used in the present invention. Preferably, the pet food will contain an appropriate protein source such as chicken or fish protein. Most preferably, the pet food will contain chicken protein.

A process for reducing the amount of harmful bacteria in the small intestine of animals is also provided. The process comprises feeding an animal a diet consisting essentially of a pet food composition containing, on a dry matter basis, from about 0.2 to 1.5 weight percent of a fructooligosaccharide. Preferably, the animal is selected from the group consisting of dogs, cats, and horses. Most preferably, the animal is a dog.

In order that the invention may be more readily understood, reference is made to the following example which is intended to illustrate the invention, but not limit the scope thereof.

Example

Sixteen IgA-deficient German Shepherd dogs with spontaneous IBO were used to determine the effects of fructooligosaccharides on the canine gastrointestinal system. The dogs were 15–20 months old and from four litters. They were fed an initial diet (Diet A) for three months which contained no oligosaccharides. The contents of this diet are listed in Table 1. Intestinal juice and mucosal tissue from the dogs was sampled at this point and cultured. Twenty-eight days after sampling the dogs' intestinal juice and mucosal tissue, the diets for eight of the dogs were switched to Diet B. Diet B contained the same ingredients as Diet A, with the exception that one percent of corn starch was replaced with fructooligosaccharide (see Table 1). The dogs' intestinal juice and mucosal tissue was then resampled 46–51 days after starting the different diets. The intestinal juice and mucosal tissue was cultured for aerobic and anaerobic bacteria. The data is presented in Table 2. It shows that dogs eating the FOS-supplemented Diet B had significantly fewer aerobic colony forming units (CFUs) in the intestinal juice and intestinal mucosa than the dogs eating Diet A. Also, Diet B dogs had significantly fewer anaerobic CFUs in the intestinal mucosa than Diet A dogs.

TABLE 1

Ingredient composition of diets fed to dogs:

| Ingredient | Weight percent |
|---|---|
| Chicken protein (chicken and chicken byproduct meal) | 41.6 |
| Corn | 27.8 |
| Chicken fat | 9.6 |
| Rice | 7.3 |
| Beet pulp | 4.3 |
| Brewer's dried yeast | 1.1 |
| Egg | 2.87 |
| Vitamin/mineral premix | 2.52 |
| DL-methionine | 0.13 |
| Fructooligosaccharide (Diet B only) | 1.00 |
| Corn starch | remainder |

TABLE 2

Median number of bacterial CFUs/ml in the duodenal/high jejunal juice and duodenal tissue in two groups of dogs

| Bacteria | Base-line culture (Diet A) | | Culture after Group 2 dogs were fed Diet B | |
|---|---|---|---|---|
| | Group 1 | Group 2 | Group 1 | Group 2 |
| Total aerobic[1]: juice | 618,875 | 2,171,275 | 5,713,875 | 1,388,250 |
| Total anaerobic: juice | 87,000 | 2,470,000 | 378,050 | 3,150,250 |
| Total aerobic[1]: tissue | 11,875 | 6,250 | 99,225 | 16,450 |
| Total anaerobic: tissue | 33,500 | 15,000 | 41,350 | 2,600 |

[1]"Aerobic" includes both aerobic and facultative anaerobic bacteria

While certain representative embodiments and details have been shown for purposes of illustrating the invention, it will be apparent to those skilled in the art that various changes in the methods disclosed herein may be made without departing from the scope of the invention, which is defined in the appended claims.

What is claimed is:

1. A process for treating small intestine bacterial overgrowth in animals comprising feeding an animal selected from the group consisting of dogs, cats, and horses a diet consisting essentially of a pet food composition containing, on a dry matter basis, from about 0.2 to 1.5 weight percent of a fructooligosaccharide, wherein said diet decreases bacteria in the small intestine of said animal and produces a healthy bacterial environment in the small intestine of said animal.

2. The process of claim 1 wherein said fructooligosaccharide is used in a weight percent of about 1.0.

3. The process of claim 1 wherein said animal is a dog.

* * * * *